Feb. 14, 1933.   P. YATES   1,897,657
METERING SYSTEM
Filed Dec. 26, 1929
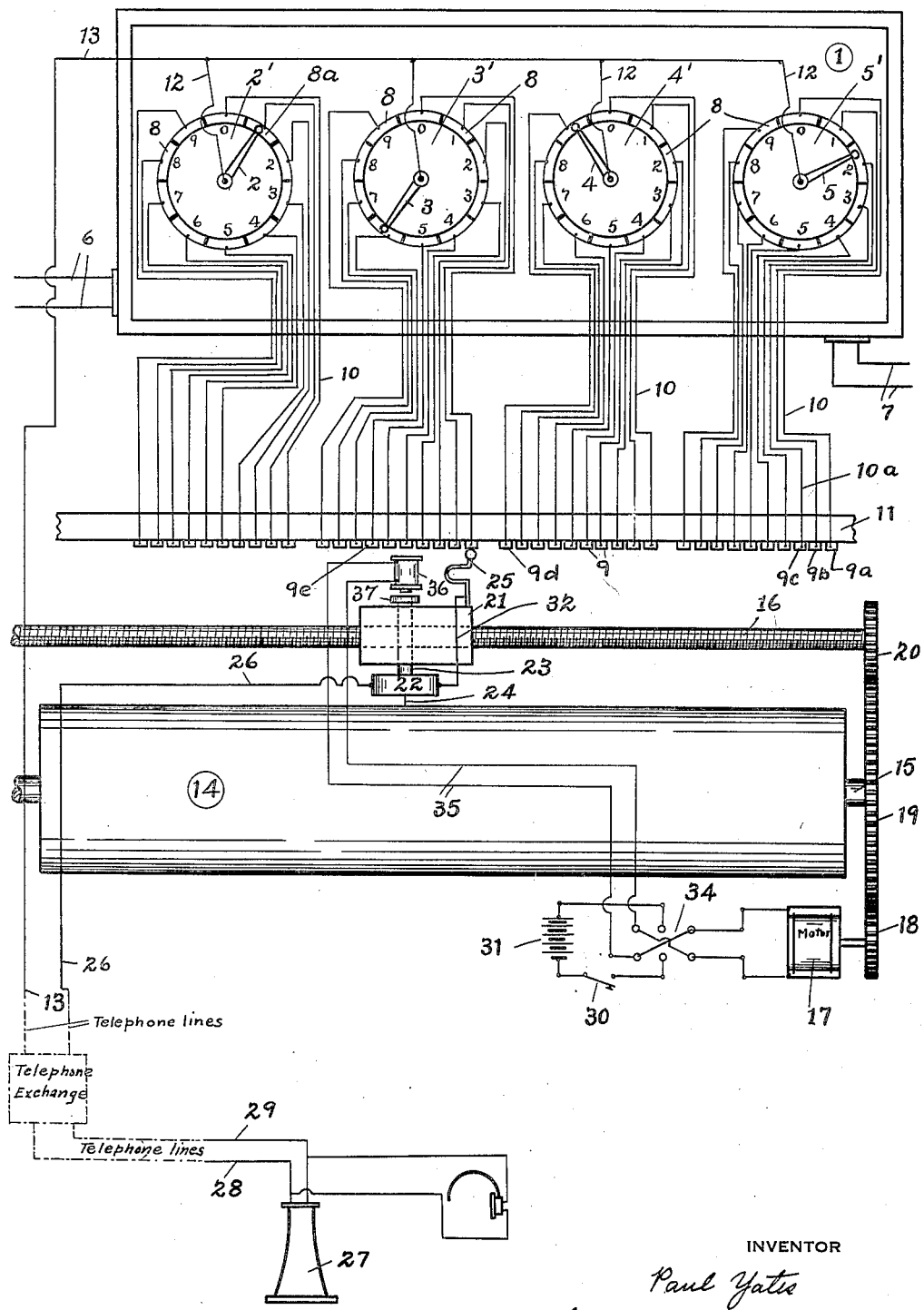
INVENTOR
Paul Yates
by Christy Christy and Wharton
his attorneys Patented Feb. 14, 1933

1,897,657

UNITED STATES PATENT OFFICE

PAUL YATES, OF PITTSBURGH, PENNSYLVANIA, ASSIGNOR, BY MESNE ASSIGNMENTS, TO THE OIL CITY NATIONAL BANK, OF OIL CITY, PENNSYLVANIA, AS TRUSTEE

METERING SYSTEM

Application filed December 26, 1929. Serial No. 416,373.

My invention relates to metering systems, and particularly to those metering systems in use to meter the electricity, gas or water which is supplied to the consumer.

The object of invention is to provide instrumentalities which may be organized with a metering system and with an electrical communication system to enable an operator to read from a central station the many remotely situated meters of the metering system. That is to say, I desire to provide means whereby an electrical power company, for example, may from a single location read the several meters of its subscribers.

To the end that the invention may be readily understood, I have shown diagrammatically in the accompanying drawing only the novel instrumentalities of my invention, and have not indicated the circuits of the electrical communication system with which these instrumentalities are associated. Although a communication system, such as the Bell telephone system, for example, may be refined in certain particulars to better adapt it to this invention, any of the usual conductive or inductive electrical communication systems now in use may be employed without great change.

I have shown my invention in conjunction with electrical meters, which electrical meters usually have dialed faces, indicating the power consumption; but, it is to be understood that the invention may equally well be applied to any meters. Referring to the drawing the meter 1, diagrammatically illustrated in front elevation, indicates by its four indices 2, 3, 4, 5 on dial-faces 2', 3', 4', 5' the power passing from the electrical supply lines 6 to the subscriber's or consumer's lines 7. Each dial-face is numbered, and known instrumentalities function within the meter to rotate the indices from one dial-face number to another in accordance with the power drawn by lines 7. The indices are geared to these known instrumentalities to rotate each at a different velocity; therefore, a composite reading of the four indices is necessary to reveal in kilowatt hours the power so drawn.

Adjacent the periphery of each dial-face there is secured a plurality of contacts 8. The contacts are arranged side-by-side, but they are electrically insulated from each other. There is a contact 8 for each number on the dial-face, and each contact represents a dial number. Each contact on each dial-face has a fixed position relative to the other contacts, and the several contacts correspond in their position relatively to each other in the same manner that the numbers which the several contacts represent correspond in position to each other. Each of the indices 2, 3, 4, 5 is adapted, as it rotates, to engage progressively the several contacts 8 which are arranged adjacent the dial-face with which the index is associated. The contacts 8 are electrically conductive, and so are the indices. Electrical current may, therefore, pass through each index to that particular contact which at the time the index engages. The several contacts 8 of each dial-face form each a terminal for an incomplete electrical circuit. That is to say, each contact 8 is the terminal of one of the lead-wires 10. Each of the indices 2, 3, 4, 5 is connected by a conductor 12 to a bus-wire 13. Manifestly, as the index rotates to engage one or another of the several contacts associated therewith, the index will complete an electrical circuit from the bus-wire 13 (through the index to the contact which is at the time engaged by the index) to the lead-wire 10 which is connected to the engaged contact.

Means are associated with the several electrical circuits—there being, as mentioned above, a circuit for each contact—to distinguish the circuits one from the other, and to indicate which circuit of each dial-face is completed. It follows, therefore, that it is possible to ascertain (for each dial-face) which one of the several contacts is engaged by the index associated therewith. To know which contact is engaged by an index is to know to which numeral the index points. Hence, the readings of the several dials are ascertained through the operation of the indices to complete significant electrical circuits.

The above-mentioned means for distinguishing the several electrical circuits, and for indicating to which dial-face numeral each index points, are illustrated diagrammatically in the drawing. These means include a dictaphone-recording cylinder 14 which is suitably fixed upon a mandrel on shaft 15. The mandrel is within the cylinder 14 and does not appear in the drawing. Extending in parallelism with shaft 15 is a lead-screw 16. A motor 17 is provided with driving connections to rotate in synchronism the lead-screw 16 and the recording cylinder 14. Conveniently the driving connections may be a train of gears 18, 19, 20, affixed respectively to the driving shaft of motor 17, the shaft 15, and lead-screw 16.

In threaded engagement with the lead-screw 16 is a carriage 21, which is adapted to move longitudinally of the cylinder 14 when the lead-screw and cylinder are rotated by motor 17. Associated with carriage 21 is a transmitter 22 supported on a stem 23, stem 23 being so supported as to permit a slight vertical movement. The transmitter 22 is provided with a stylus 24 which normally is in contact with the surface of the recording-cylinder 14. The stylus 24 is connected to a diaphragm within the transmiter 22, and known instrumentalities, such as an electromagnet and its associated electrical conductors, are organized with the diaphragm to alter an electrical current, passing through the transmitter, in accordance with the oscillations of the stylus. It is well known in the telephone, dictaphone and phonograph arts that the effects of sound or the movement of a diaphragm may be impressed on an electrical current. It is well known that, at any point on the circuit which carries such current, a receiver may be included to reproduce the sounds or diaphragm movements of the transmitter. The transmitter 22 is organized with the recording cylinder 14 to impress on the current of a circuit—preferably a circuit of a communication system—oscillations to indicate (through a receiver in the circuit) to which one of the numbers each index points.

Upon the surface of cylinder 14 there is impressed, in a manner well known to the dictaphone and phonograph arts, indentations, which indentations lie in helical continuity on the surface of the cylinder. When the stylus of the transmitter 22 is placed in the helical path of the indentations and the cylinder 14 is revolved, the stylus will vibrate in accordance with its reaction to the indentations. The diaphragm associated with the stylus will vibrate to cause the transmitter to produce an effect upon any suitable electrical current which passes from the transmitter to a speaking receiver, and the receiver will in accordance with the effect produce sound. The indentations on the cylinder are preferably adapted to produce such sounds in the form of words, indeed, the cylinder 14 is so adapted. The indentations on the cylinder 14 are adapted to cause a speaking receiver in electrical communication with the transmitter 22 to speak during separated intervals of time. From a position adjacent the right-hand end of the cylinder, the stylus being in engagement with the helical continuity of indentations on the cylinder will, as the cylinder revolves, move in accordance with the lead of the helical continuity. This movement of the stylus is created by the lead-screw 16, rotating in the carriage 21 in synchronism with rotation of the cylinder 14. As the stylus 24 moves from the right-hand end of the cylinder 14 to its left-hand end, the receiver in circuit with the transmitter will speak as follows:

"Dial five f-i-v-e reads zero z-e-r-o (this is followed by an interval of silence) dial five f-i-v-e reads one o-n-e (an interval of silence follows) dial five f-i-v-e reads two t-w-o (interval of silence) dial five f-i-v-e reads three t-h-r-e-e (intervals of silence) + + + (this sequence is followed for every number on dial 5,—after a period of silence the speaking then continues) dial four f-o-u-r reads zero z-e-r-o (interval of silence) dial four f-o-u-r reads one o-n-e (interval of silence) dial four f-o-u-r reads two t-w-o (interval of silence) + + + + (this sequence continues for each number on each dial)."

The electrical receiver speaks progressively all of the words recorded on the cylinder, as described above, because the electrical circuit in which the transmitter and receiver operate (according to the description) is a single closed circuit. A single closed circuit was used in this descriptive matter to more readily make the records or indentations of cylinder 14 understood. As a matter of fact there is not merely a single electrical circuit associated with transmitter 22; there is a plurality of incomplete circuits associated with the transmitter. That is to say, the several incomplete circuits (previously described) through indices 2, 3, 4, 5 and contacts 8 are organized to be from time to time completed in series with the circuit of the transmitter 22. Of these several incomplete circuits only those associated with the contacts that are at the particular time engaged by the index will be completed. Therefore, the circuit through the transmitter 22 to the speaking receiver may be completed only through the closing of one or the other of the several incomplete circuits of each dial-face.

On an electrical-non-conducting frame 11 there is supported, one separated from the other, a plurality of auxiliary contacts 9. There is one auxiliary contact 9 for each contact 8, and the lead-wires 10 serve to interconnect, according to their numerical relation around the dial-faces, one contact 8 with each auxiliary contact 9. A brush 25 is mounted on carriage 21 to engage electrically one after the other the contacts 9, as the carriage travels on the lead-screw 16. The several contacts 9 are arranged with intervals of space between them, the intervals of space being equal to that space through which the stylus moves laterally on the cylinder 14 during the periods of silence between the sounding of each set of numbers recorded on the cylinder.

It is convenient, as has been said, to organize the device with a telephone system, and in such organization it is preferable, but not necessary, that the connections to the telephone system be electrically parallel. I shall describe the connections in a parallel hook-up. To one of the subscriber's telephone wires, assuming that telephone system operates with the usual two wire circuit, the bus-wire 13 is connected. To the other of the subscriber's telephone wires, the wire 26 leading to the transmitter 22 is connected. In the office of the power company a loud-speaking receiver 27 is installed. Through the wires 28 and 29 the speaking receiver 27 is connected to the power company's telephone wires. Obviously, a dictaphone recording device, or several sets of head-phones may be paralleled with the receiver 27.

The meter reader wishing to read meter 1 calls (on the power company's telephone) the operator at the telephone exchange and gives the number of the subscriber's telephone, with which telephone meter 1 is associated. The meter reader is connected at the telephone exchange with the subscriber's telephone, and when the subscriber's telephone is answered the meter reader tells the answering party that he is the meter reader, and he asks that party to close switch 30 which is conveniently located near the subscriber's telephone. The stylus 24, it will be understood, is always positioned at the beginning of the recording indentations of the cylinder (at the right-hand end of the cylinder 14) when each reading is started by the closing of switch 30. The closing of switch 30 completes an electrical circuit through a source of energy 31 to the motor 17, and the motor rotates and in so rotating drives the cylinder 14 and lead-screw 16. The carriage 21 travels, supporting the transmitter 22 with the stylus 24 engaging the path of the recorded indentations on the cylinder. The speaking receiver 27 does not speak, however, when the brush 25 contacts in its movement the contact 9a or 9b, because the circuit through the meter to the telephone system is incomplete. That is, there is a gap in the circuit between the index 5 and the contacts 8 which correspond to the numerals 0 and 1 of dial-face 5'. When the brush 25 strikes contact 9c, however, a circuit is completed from speaking receiver 27 through wire 28 to one wire of the telephone system, from that telephone wire to bus-wire 13, from bus-wire 13 to wire 12 of index 5, from index 5 to the contact 8 lying adjacent the numeral 2, from the contact of numeral 2 through lead wire 10a to contact 9c, from contact 9c to brush 25, from brush 25 through wire 32 to the transmitter 22, through transmitter 22 to line 26, from line 26 to the other wire of the telephone system, and thence to wire 29 and receiver 27.

The electrical energy of the telephone system will now cause the receiver 27 to speak in accordance with the record on the cylinder 14, and, since the words recorded on the cylinder are appropriately timed with the movement of the brush 25 on the contacts 9, the speaking transmitter will be caused to speak as follows: "Dial five f-i-v-e reads two t-w-o". These words are spoken while the brush is in engagement with contact 9c.

Continued advancement of the carriage 21 moves brush 25 out of engagement with contact 9c and breaks the above-mentioned circuit. The circuit through the transmitter 22 will remain broken until the brush 25 strikes contact 9d. The speaking receiver will then speak, "Dial four f-o-u-r reads nine n-i-n-e". The circuit will again break when the brush 25 leaves contact 9d. Silence of the receiver 27 prevails until the brush 25 strikes contact 9e. The circuit is again complete, and the receiver will speak, "Dial three t-h-r-e-e reads six s-i-x". The operation continues so, until all dials of the meter have been read, in this case until the positions of the four indices 2, 3, 4, 5 have been determined.

When the carriage 21 reaches the end of its right to left movement it operates a reversing switch, diagrammatically indicated at 34 in the drawing, and the rotation of motor 17 is reversed to move the carriage 21 back to starting position. Conveniently, the reversing switch may be in structure the well-known "Star" switch; it may be borne on the carriage, and at each end of the path of carriage travel it will strike a stationary stop member to reverse it. For a more detailed description of how this reversing may be accomplished turn to my co-pending application, Serial No. 530,781, filed Apr. 17, 1931. The drawing being diagrammatical merely indicates the reversing switch in the motor circuit. Suffice it to say that the reversing switch is thrown automatically to reverse the motor, and when the switch is so thrown a shunt-circuit 35 is completed through a magnet 36 on carriage 21. The magnet 36 is thus energized, and it attracts the head 37 of stem 23, lifting the transmitter and its stylus 24. The stylus is thus removed from contact with the cylinder 14 while the carriage 21 is returning to starting position.

When the carriage reaches its starting position the reversing switch strikes a stop (not shown) and the switch is returned to its starting position. The shunt-circuit is thereby opened, and the magnet 36 becoming ineffective allows the stylus to fall into contact with the cylinder.

The time required for the return of the carriage to starting position is known to the meter reader, and he may, therefore, instruct the party answering the subscriber's telephone to open switch 30 when the carriage has reached starting position.

Manifestly, all of the meters of a power company may be severally provided with the devices of my invention and connected to a telephone system. The readings of all such meters may be accurately determined in the office of a meter reader.

It is conceivable that auxiliary electrical means may be associated with the telephone system, whereby the subscriber need not answer the telephone for the meter reader to take a reading. That is to say, that a system of polarized-relays may be operated from the meter reader's office to automatically control the reading of a subscriber's meter, without the subscriber knowing that the reading is being made. These refinements, however, are thought to be the subject matter for other applications for patent (see my co-pending applications Serial No. 530,781, filed Apr. 17, 1931, and Serial No. 533,988, filed April 30, 1931).

In the specification I have described the metering device in connection with a double-wire telephone circuit. The reading operation may be conducted over any electrical communication circuit or transmission circuit embodying my invention.

What I claim is:

1. In a meter-reading system, the combination of a meter including an instrumentality movable progressively from one metering position to another, an incomplete electrical circuit associated with each of such metering positions, said metering instrumentality being adapted during its movement to complete one or another of said incomplete circuits, a cylinder provided with records impressed in a helical path in its face, which records correspond in significance and in sequence with the several positions which are successively taken by said metering instrumentality, a transmitter, a stylus carried by said transmitter and adapted to engage said cylinder, means for rotating said cylinder means for shifting said transmitter and causing said stylus to remain in the helical path recorded in said cylinder, contact means movable to connect, said transmitter to that particular incomplete electrical circuit which corresponds at a given instant to the position of said metering instrumentality, which contact means is movable in synchronism with the records upon said cylinder, whereby a particular record on the cylinder is engaged by said stylus during the interval of time in which said contact means connects said transmitter to the circuit which is associated with the corresponding position of the metering instrumentality, an electrical communication circuit, electrical connections from said incomplete circuits to said communication circuit, electrical connections from said movable contact to said transmitter, electrical connections from said transmitter to said communication circuit, a receiver in said communication circuit, whereby, as the stylus moves over said cylinder the receiver is caused to signify the reading of the meter.

2. In a meter-reading system, the combination of a meter including an instrumentality movable progressively from one metering position to another, an electrical contact block associated with each of such metering positions, which contact blocks each comprise a terminal of an incomplete electrical circuit, said metering instrumentality comprising another terminal of said incomplete circuits, whereby, as such instrumentality moves, it makes and breaks one after another circuits through such contact blocks, a cylinder provided with records impressed in a helical path in its face, which records correspond in significance and in sequence with the several contact blocks which are successively contacted by said metering instrumentality, a transmitter, a stylus carried by said transmitter and adapted to engage said cylinder, means for rotating said cylinder and causing said stylus to remain in said helical path recorded in the cylinder, a communication circuit, connections from said transmitter to said communication circuit, connections from said metering instrumentality to said communication circuit, means for bringing said transmitter under the electrical influence of said communication circuit, whereby the circuit, which is closed by said metering instrumentality, is closed when said stylus engages that particular record on said cylinder which corresponds in sequence to the metering position of said instrumentality, a receiver in said communication circuit, whereby, as the stylus moves along the path of said last-mentioned record, the receiver is caused to signify the reading of the meter.

3. In a meter-reading system, the combination of a meter including an instrumentality movable progressively from one metering position to another, an incomplete electrical circuit associated with each of such metering positions, arcuately arranged contacts co-operating with said meter instrumentality to make-and-break successively said incomplete circuits as it progresses from one metering position to another, a series of contacts, said electrical circuits being connected each to one of said contacts, the said circuits being consecutively connected to said contacts so that the circuits establish in the contacts the same sequence as exists between the successive metering positions of said metering instrumentality, a cylinder provided with records in helical continuity, which records correspond in significance and in sequence with the several positions of said metering instrumentality, a transmitter including a stylus adapted to engage said cylinder, means for rotating said cylinder, means for shifting said transmitter over the face of said cylinder, the rotation of said cylinder being synchronized with the movement of said transmitter, whereby said stylus in engageing said cylinder follows the helical path of said records, an electrical brush, means for moving said brush over said series of contacts, the movement of said brush over said contacts being synchronized with the rotary movement of said cylinder, whereby a particular record on the cylinder is engaged by said stylus during the interval in which said brush engages that contact of the series which is associated with that particular position of the metering instrumentality which is correlated to said last-mentioned record, an electrical communication circuit, electrical connections from said incomplete circuits to said communication circuit, electrical connections from said brush to said transmitter, electrical connections from said transmitter to said communication circuit, a receiver in said communication circuit, whereby, as said stylus moves over said cylinder, that particular circuit which corresponds to the metering position of said metering instrumentality is completed through the transmitter and communication circuit, and the receiver is caused to signify the reading of the meter.

4. In a meter-reading system, the combination of a meter including an instrumentality movable progressively from one metering position to another, an incomplete electrical circuit associated with each of such metering positions, means associated with said metering instrumentality whereby one or another of said circuits is adapted to be completed, a series of contacts, said electrical circuits being connected each to one of said contacts, the said circuits being consecutively connected to said contacts so that the circuits establish in the contacts the same sequence as exists between the successive metering positions of said metering instrumentality, a cylinder provided with records in helical continuity, which records correspond in significance and in sequence with the several positions of said metering instrumentality, a transmitter including a stylus adapted to engage said cylinder, means for rotating said cylinder, means for shifting said transmitter over the face of said cylinder, the rotation of said cylinder being synchronized with the movement of said transmitter, whereby said stylus in engaging said cylinder follows the helical path of said records, an electrical brush, means for moving said brush over said series of contacts, the movement of said brush over said contacts being synchronized with the rotary movement of said cylinder, whereby a particular record on the cylinder is engaged by said stylus during the interval in which said brush engages that contact of the series which is associated with that particular position of the metering instrumentality which is correlated to said last-mentioned record, an electrical communication circuit, electrical connections from said incomplete circuits to said communication circuit, electrical connections from said brush to said transmitter, electrical connections from said transmitter to said communication circuit, a receiver in said communication circuit, whereby, as said stylus moves over said cylinder, that particular circuit which corresponds to the metering position of said metering instrumentality is completed through the transmitter and communication circuit, and the receiver is caused to signify the reading of the meter.

In testimony whereof I have hereunto set my hand.

PAUL YATES.